United States Patent
Yoneda et al.

(10) Patent No.: US 7,478,568 B2
(45) Date of Patent: Jan. 20, 2009

(54) MAGNETOSTRICTIVE TORQUE SENSOR SYSTEM AND ELECTRIC POWER STEERING APPARATUS EMPLOYING THE SAME

(75) Inventors: Atsuhiko Yoneda, Wako (JP); Yasuo Shimizu, Wako (JP); Shunichiro Sueyoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 11/727,934

(22) Filed: Mar. 29, 2007

(65) Prior Publication Data
US 2007/0240523 A1   Oct. 18, 2007

(30) Foreign Application Priority Data
Mar. 29, 2006   (JP)   ............... 2006-091831

(51) Int. Cl.
*G01L 3/00* (2006.01)
(52) U.S. Cl. ............... 73/862.333; 73/862.331; 73/862.335
(58) Field of Classification Search ............... 73/862.326–862.336
See application file for complete search history.

(56) References Cited

U.S. PATENT DOCUMENTS

| | | | | |
|---|---|---|---|---|
| 5,641,916 | A * | 6/1997 | Satoh et al. | 73/862.331 |
| 6,966,232 | B2 * | 11/2005 | Asaumi et al. | 73/862.333 |
| 2003/0051563 | A1 * | 3/2003 | Jin et al. | 73/862.331 |
| 2004/0050181 | A1 * | 3/2004 | Shimizu et al. | 73/862.331 |
| 2007/0283768 | A1 * | 12/2007 | Yoneda et al. | 73/862.333 |

FOREIGN PATENT DOCUMENTS

| JP | 2001-133337 A | 5/2001 |
|---|---|---|
| JP | 2002-071476 A | 3/2002 |
| JP | 2002-168706 A | 6/2002 |
| JP | 2005-321316 A | 11/2005 |

* cited by examiner

*Primary Examiner*—Michael Cygan
*Assistant Examiner*—Jonathan Dunlap
(74) *Attorney, Agent, or Firm*—Arent Fox LLP.

(57) ABSTRACT

A magnetostrictive torque sensor system stabilizes and detects steering torque applied to a steering shaft. The sensor system comprises magnetic-characteristic variation parts that are provided to the steering shaft, wherein magnetic characteristics of the magnetic-characteristic variation parts change in accordance with the applied torque; coils that are positioned around the magnetic-characteristic variation parts and that respond to changes in the magnetic characteristics; resistance elements that are serially connected to the coils; voltage-applying means for periodically applying a voltage to serial circuits that are formed from the coils and the resistance elements; terminals for retrieving changes in the terminal voltage of the coils; phase-shifting means for inverting the phase of the change in the terminal voltage of the coils; selecting means for alternatingly selecting and outputting the voltage change in the terminals and the voltage change in the output ends of the phase-shifting means; and smoothing means for smoothing the voltage signals output from the selecting means and for outputting a direct-current voltage.

5 Claims, 9 Drawing Sheets

MAGNETOSTRICTIVE TORQUE SENSOR SYSTEM AND ELECTRIC POWER STEERING APPARATUS EMPLOYING THE SAME

FIELD OF THE INVENTION

The present invention relates to a magnetostrictive torque sensor system for detecting torque using changes in the inductance of a coil provided around a magnetostrictive film. The present invention also relates to an electric power-steering apparatus that uses the magnetostrictive torque sensor system.

BACKGROUND OF THE INVENTION

In electric power-steering apparatuses, an electric motor for producing a supplementary force is fixed to a mechanical steering apparatus, and the rotational torque provided by the motor is controlled using a control device, whereby the steering torque that must be applied by the driver is reduced. In conventional electric power-steering apparatuses, a steering-torque detecting part is provided to a steering shaft linked to the steering wheel. The steering-torque detecting part supplies detection signals to the control device in order to cause the motor to produce an appropriate supplementary steering torque.

Torsion-bar torque sensor systems that make use of the torsion of a torsion bar are the conventional steering-torque detecting parts that have been primarily used. Magnetostrictive torque sensor systems have also been proposed in recent years.

In magnetostrictive torque sensor systems, a magnetostrictive film formed of, e.g., a Ni—Fe plating is provided to two locations on the steering shaft. The magnetostrictive films in these two locations are both formed annularly in the circumferential direction on the surface of the steering shaft and are positioned vertically relative to one another in the axial direction. The magnetostrictive films in these two locations are also formed so as to have the necessary width in the axial direction and are made so as to be magnetically anisotropic in mutually opposing directions. When the driver applies a steering torque to the steering shaft, changes in the magnetostrictive characteristics that occur based on the magnetic anisotropy of the magnetostrictive films in these two locations are detected by a coil provided around the magnetostrictive films.

Such magnetostrictive torque sensor systems are disclosed in, e.g., JP-A 2001-133337 and JP-A 2002-168706.

The magnetostrictive torque sensor systems described in JP-A 2001-133337 and JP-A 2002-168706 have a magnetizing coil and detection coil that are provided respectively to the two annular magnetostrictive films formed on the surface of the steering shaft. There are also magnetostrictive torque sensor systems that detect torque according to changes in the inductance of the detection coil, using only a detection coil without a magnetizing coil (see, e.g., JP-A 2002-71476 and JP-A 2005-321316).

The detection circuit of the magnetostrictive torque sensor system described in JP-A 2002-71476 has a coil around the magnetostrictive films formed on the surface of the steering shaft and also has a resistance element and a switching element that are serially connected to the coil. A power source that applies the necessary voltage is provided to the coil. A bottom-hold circuit for maintaining the minimum value of the output signal is also connected to the connecting part between the resistance element and the coil.

JP-A 2005-321316 discloses a magnetostrictive torque sensor system that improves on the magnetostrictive torque sensor system described in JP-A 2002-71476. This magnetostrictive torque sensor system also has a coil positioned around the magnetostrictive films, as well as a resistance element and a switching element that are serially connected to the coil.

In the conventional magnetostrictive torque sensor systems disclosed in, e.g., JP-A 2005-321316, the frequency of the on/off operation of the switching element is, e.g., about 30 kHz. The frequency of the change in the voltage signal retrieved from the terminal of the coil that responds to changes in the magnetic characteristics of the magnetostrictive films is also about 30 kHz. As a result, the detection period of the peak-hold circuit used in the detection circuit can be calculated as the inverse of 30 kHz. When the detection period of the peak-hold circuit is in a frequency range of 30 kHz, then in terms of the frequency characteristics, the gain usually decays and phase lag increases. An increase in the phase lag in the output signal of the magnetostrictive torque sensor system results in reduced stability with which the electric power-steering apparatus is controlled, and greater loss in the uniformity of the supplementary force for reducing the steering torque that must be applied by the driver. Problems result in that the entire steering torque loses consistency, and the driver increasingly loses proper steering response.

A magnetostrictive torque sensor system has therefore been needed for stabilizing the steering torque applied to the steering shaft and performing detection, without affecting the frequency characteristics of the peak-hold circuit used in the detection circuit of conventional magnetostrictive torque sensor systems and without giving rise to gain decay or phase lag in the torque-detection signal. A demand has also arisen for an electric power-steering apparatus that can provide a good steering response using a magnetostrictive torque sensor system.

SUMMARY OF THE INVENTION

According to a first aspect of the present invention, there is provided a magnetostrictive torque sensor system comprising: at least one magnetic-characteristic variation part mounted on a rotating shaft and adapted so that a magnetic characteristic thereof varies in accordance with an applied torque; a coil that is positioned around the magnetic-characteristic variation part and responds to a change in the magnetic characteristic; a resistance element that is serially connected to the coil; voltage-applying means for periodically applying a voltage to a serial circuit that is formed from the coil and the resistance element; a terminal for retrieving a change in a terminal voltage of the coil; phase-shifting means for inverting a phase of the change in the terminal voltage of the coil; selecting means for alternatingly selecting and outputting a voltage change in the terminal and a voltage change in an output end of the phase-shifting means; and smoothing means for smoothing a voltage signal output from the selecting means and for outputting a direct-current voltage.

When the magnetic characteristics of the magnetostrictive films formed on the rotating shaft in this configuration change in accordance with a torque applied to the rotating shaft, the change in magnetic characteristics is retrieved as a change in the terminal voltage of the coil. The terminal voltage of the coil is retrieved as a periodic voltage signal by the voltage-applying part, which applies a periodic voltage. The waveform of this voltage signal starts to rise in accordance with an "on" operation, at which time the state of the waveform on startup varies in accordance with the torque applied to the rotating shaft. Finally, the periodic terminal-voltage signal of the coil and the periodic voltage signal resulting from the inversion of this signal are selected and synthesized in alternation, resulting in a voltage signal that is smoothed by the smoothing part. A direct-current voltage signal corresponding to the applied torque is accordingly obtained. The voltage signal output from the smoothing part corresponds to changes in the inductance of the coil that responds to changes in the magnetic characteristics of the magnetostrictive films.

Preferably, the magnetostrictive films are provided to two locations on the rotating shaft, and the coil, resistance element, voltage-applying part, terminal, phase-shifting part, selecting part, and smoothing parts are provided individually to the respective magnetostrictive films in these two locations. A calculating part is also provided for calculating a difference in the two voltage signals that are respectively output from each of the two smoothing parts. In this configuration, the difference in the voltage values output from each of the calculating parts of the two magnetostrictive films is determined, whereby a value is obtained for the voltage signal corresponding to the torque applied to the rotating shaft. The value of the voltage signal is input to a subsequent-stage sample-hold circuit. The sample-hold circuit is different from conventional bottom-hold circuits and can detect the stabilized applied torque without relying on the operational frequency characteristics of a switching element.

Desirably, the resistance element comprises a coil that is positioned around the rotating shaft, wherein a wrapping direction relative to the rotating shaft is the same for at least one of the coils responding to the change in the magnetic characteristic and for at least one of the coils used as the resistance element.

Preferably, the voltage-applying part comprises a constant voltage source and a switching element that is connected to the constant voltage source.

According to a second aspect of the present invention, there is provided an electric power-steering apparatus comprising: a motor for applying a torque to a steering shaft; a magnetostrictive torque sensor system for detecting a steering torque applied to the steering shaft; target-current calculating means for calculating a target electrical current of the motor in accordance with a signal from the sensor system; and driving means for driving the motor, wherein the magnetostrictive torque sensor system has a magnetic-characteristic variation part that is provided to the steering shaft, wherein a magnetic characteristic of the magnetic-characteristic variation part changes in accordance with the applied torque; a coil that is positioned around the magnetic-characteristic variation part and that responds to a change in the magnetic characteristic; a resistance element that is serially connected to the coil; voltage-applying means for periodically applying a voltage to a serial circuit that is formed from the coil and the resistance element; a terminal for retrieving a change in a terminal voltage of the coil; phase-shifting means for inverting a phase of the change in the terminal voltage of the coil; selecting means for alternatingly selecting and outputting a voltage change in the terminal and a voltage change in an output end of the phase-shifting means; and smoothing means for smoothing a voltage signal output from the selecting means and for outputting a direct-current voltage.

In this configuration, a voltage signal input to a hold circuit for holding a signal value corresponding to the applied torque becomes a direct-current voltage signal. The hold circuit is therefore not used in the region in which the frequency characteristics decay, and phase lag does not occur in the hold part or in the sensor output signal. The torque applied to the steering shaft can therefore be stabilized and detected.

Furthermore, a magnetostrictive torque sensor system having the aforementioned characteristics is used, whereby no phase lag is experienced in control, control is stabilized, and a smooth, satisfactory steering response can be obtained.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Figure 1:
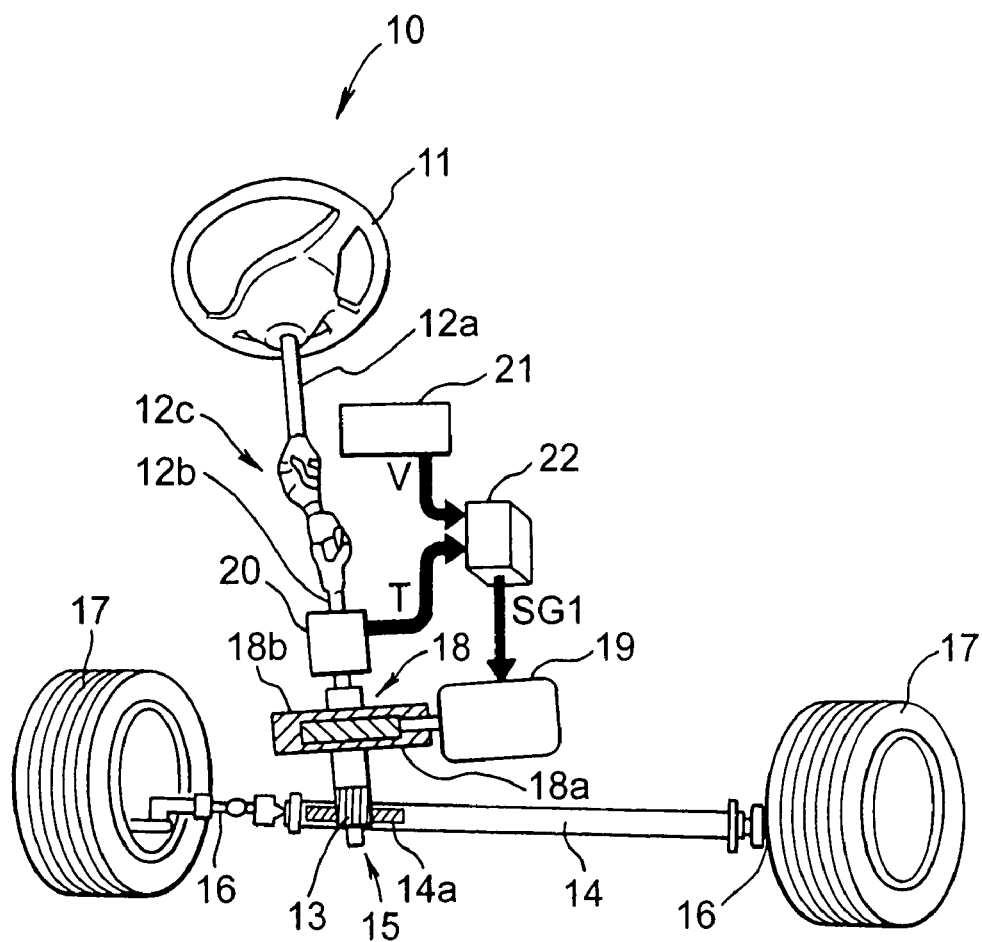
FIG. 1 is a schematic view illustrating the overall arrangement of an electric power-steering apparatus to which the magnetostrictive torque sensor system according to an embodiment of the present invention is applied.

An electric power-steering apparatus 10 in FIG. 1 is configured to provide a supplemental steering torque to a steering shaft (12*a*, 12*b*) that is linked to a steering wheel 11. The steering shaft is provided with an upper shaft portion 12*a* and a lower shaft portion 12*b*. The upper steering shaft 12*a* is linked to the lower steering shaft 12*b* via a universal shaft coupling 12*c*. The upper end of the steering shaft 12*a* is linked to the steering wheel 11. A pinion gear 13 is attached to the lower end of the steering shaft 12*b*. A rack gear 14*a* of a rack 14 is engaged with the pinion gear 13. A rack-and-pinion mechanism 15 is formed from the pinion gear 13 and the rack gear 14*a*. Tie rods 16 are provided to both ends of the rack 14, and front wheels 17 are attached to the outside ends of the tie rods 16.

An electric motor 19 is provided to the steering shaft 12*b* via a motive-force transmission mechanism 18. The motive-force transmission mechanism 18 is formed from a worm gear 18*a* and a worm wheel 18*b*. The motor 19 outputs a rotational force (torque) that supplements the steering torque. This rotational force is provided to the steering shaft 12*b* by way of the motive-force transmission mechanism 18. A steering-torque detection part 20 is also provided to the steering shaft 12*b*. The steering-torque detection part 20 detects steering torque applied to the steering shafts 12*a*, 12*b* when a driver operates the steering wheel 11 and thereby generates steering torque on the steering shafts 12*a*, 12*b*.

Reference number 21 designates a vehicle-speed detection part for detecting the speed of the vehicle, and reference number 22 designates a control device that is configured from a computer.

A steering torque signal (T) from the steering-torque detection part 20 and a vehicle speed signal (V) from the vehicle-speed detection part 21 are input to the control device 22, which outputs a drive-control signal SG1 for controlling the rotational operation of the motor 19.

The rack-and-pinion mechanism 15 and the like are housed in a gear box that is not shown in FIG. 1. The gear box is designated by the reference number 24 in FIGS. 2 and 3.

In the electric power-steering apparatus 10 as described above, the steering-torque detection part 20, the vehicle-speed detection part 21, the control device 22, the motor 19, and the motive-force transmission mechanism 18 are added to a standard mechanical steering structure.

When the driver operates the steering wheel 11 and steers the automobile in the direction of travel, a rotational force is converted into linear motion in the axial direction of the rack 14 via the rack-and-pinion mechanism 15 and changes the direction of travel of the front wheels 17 via the tie rods 16 on the basis of the steering torque applied to the steering shaft (12a, 12b). At the same time, the steering-torque detection part 20 provided to the steering shaft 12b detects the steering torque corresponding to the steering of the steering wheel 11 by the driver and converts the steering torque into the electrical steering torque signal T. The steering torque signal T is provided to the control device 22. The vehicle-speed detection part 21 detects the speed of the vehicle and converts the speed into the vehicle speed signal V. The vehicle speed signal V is also output to the control device 22. The control device 22 produces a motor current for driving the motor 19 on the basis of the steering torque signal T and the vehicle speed signal V. The motor 19, which is operated by the motor current, provides a supplementary steering torque to the steering shaft (12a, 12b) via the motive-force transmission mechanism 18.

The steering force that must be applied by the driver on the steering wheel 11 is reduced via the drive from the electric motor 19 as above.

Figure 2:
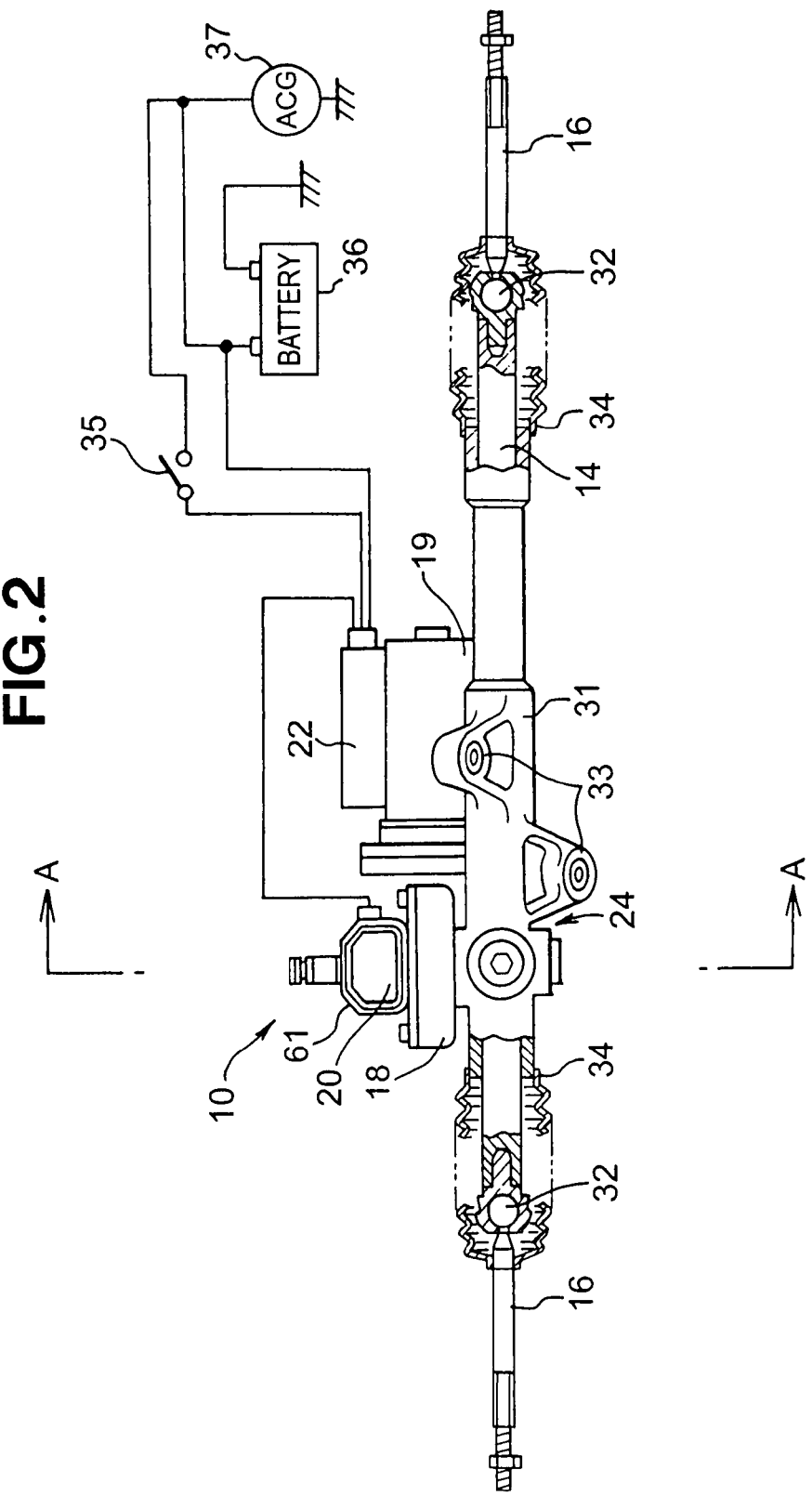
FIG. 2 is a schematic view showing the specific electrical configuration and mechanistic components of the electric power-steering apparatus.

A cross section of a portion of the left and right ends of the rack 14 is shown in FIG. 2. The rack 14 is housed within a cylindrical housing 31, which is positioned in the widthwise direction of the vehicle (the lateral direction in FIG. 2), so as to be able to slide in the axial direction. Ball joints 32 are screwed to both ends of the rack 14 protruding from the housing 31. The left and right tie rods 16 are linked respectively to the left and right ball joints 32. The housing 31 is provided with a bracket 33 and a stopper 34. The purpose of the bracket 33 is to attach the housing 31 to the vehicle body (not shown).

In FIG. 2, 35 designates an ignition switch, 36 designates an onboard battery, and 37 designates an alternating-current generator (ACG) fixed to the vehicle engine. The alternating-current generator 37 starts to produce electricity when the vehicle engine is in operation. The necessary electrical power is supplied to the control device 22 from the battery 36 or the alternating-current generator 37. The control device 22 is fixed to the motor 19.

Figure 3:
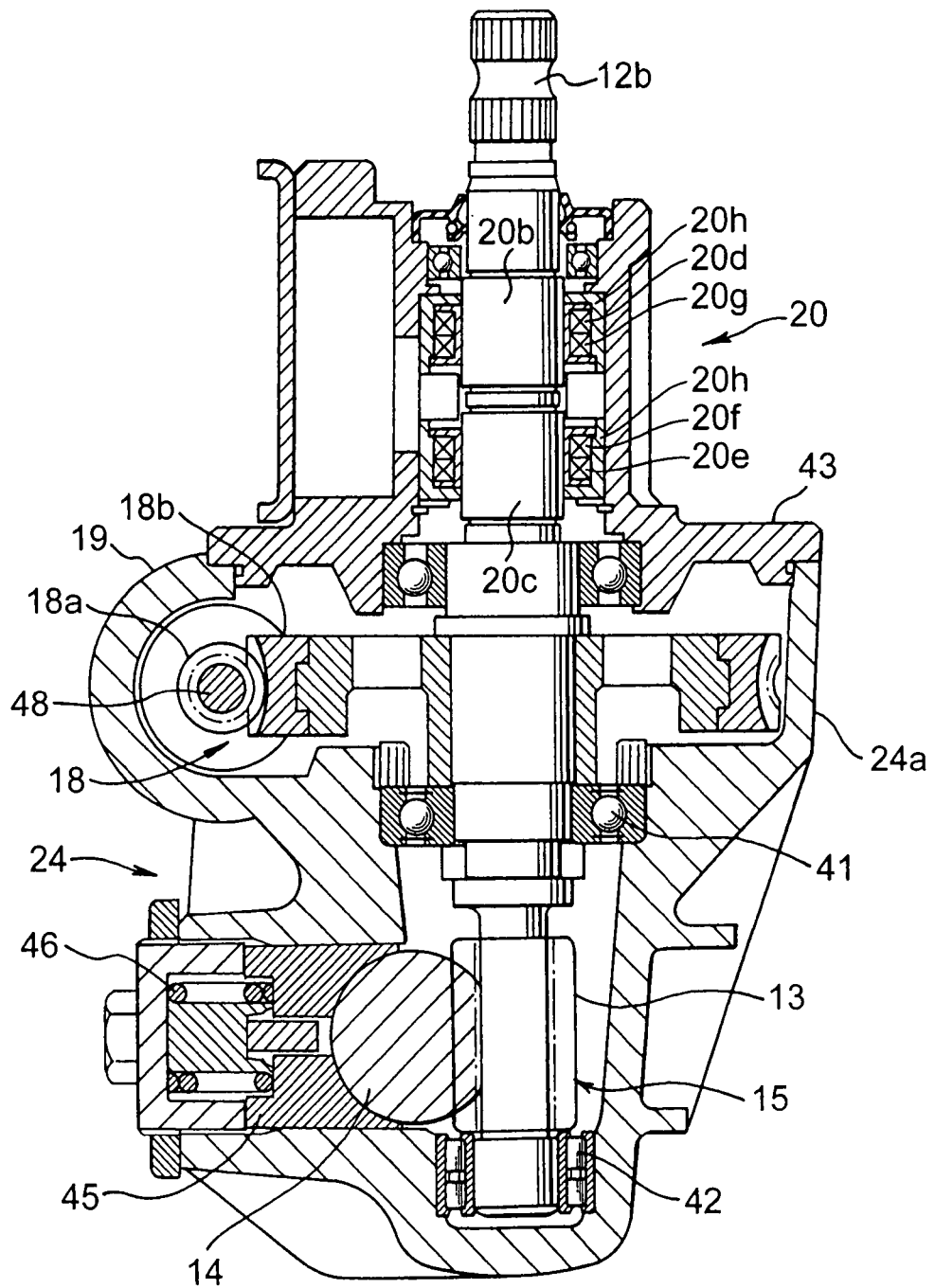
FIG. 3 is a sectional view taken along line A-A of FIG. 2.

FIG. 3 is a sectional view along the line A-A in FIG. 2. FIG. 3 shows the specific structures of the steering-torque detection part 20, the motive-force transmission mechanism 18, the rack-and-pinion mechanism 15, and the support structure of the steering shaft 12b.

In FIG. 3, the steering shaft 12b is rotatably supported by two bearing parts 41, 42 in a housing 24a that forms the gear box 24. The rack-and-pinion mechanism 15 and the motive-force transmission mechanism 18 are housed within the housing 24a, and the steering-torque detection part 20 is fixed to the upper part of the housing 24a. The upper opening of the housing 24a is covered by a lid 43 that is fixed by bolts. The pinion 13 provided to the lower end of the steering shaft 12b is positioned between the bearing parts 41, 42. The rack 14 is guided by a rack guide 45, powered by a compressed spring 46, and pressed down towards the pinion 13. The motive-force transmission mechanism 18 is formed from the worm gear 18a, which is fixed to a transmission shaft 48 linked to the output shaft of the motor 19, and the worm wheel 18b, which is fixed to the steering shaft 12b. The steering-torque detection part 20 is attached to the lid 43.

The steering-torque detection part 20 as described above is provided to the steering gear box 24. The steering-torque detection part 20 detects steering torque acting on the steering shaft 12b and inputs detection values to the control device 22. The detection values of the steering-torque detection part 20 are used as reference signals for causing the motor 19 to produce an appropriate supplementary torque.

A magnetostrictive torque sensor system is used as the steering-torque detection part 20 shown in FIG. 3 and will be referred to below as "magnetostrictive torque sensor system 20."

In the magnetostrictive torque sensor system 20 as shown in FIG. 3, two magnetostrictive films 20b, 20c are formed annularly in the circumferential direction on the surface of the steering shaft 12b. The magnetostrictive films 20b, 20c are made of, e.g., Ni—Fe plating and are provided with magnetic anisotropy. The magnetostrictive films 20b, 20c are formed in two locations, upper and lower, and are formed having prescribed widths in the axial direction of the steering shaft 12b. The magnetostrictive films 20b, 20c in these two locations are formed so as to have magnetic anisotropy in mutually opposing directions.

When a steering torque is applied to the steering shaft 12b, the opposite magnetostrictive characteristics generated in the magnetostrictive films 20b, 20c are detected in the magnetostrictive torque sensor system 20 using the alternating-current resistance or other property of coils 20d, 20e, which are positioned around the magnetostrictive films 20b, 20c.

Coils 20f, 20g in FIG. 3 are used as resistance elements.

In the magnetostrictive torque sensor system 20, a yoke part 20h is provided around the coils 20f, 20g, which act as resistance elements, and the coils 20d, 20e, which detect changes in the magnetization (the opposite magnetostrictive characteristics) of the magnetostrictive films 20b, 20c that are provided to the steering shaft 12b.

The configuration of the electrical circuit of the magnetostrictive torque sensor system 20 will be described next with reference to FIG. 4. The magnetostrictive films 20b, 20c in the magnetostrictive torque sensor system 20 are formed in two locations on the steering shaft 12b, and are formed so as to have mutually opposing magnetic anisotropy. When a torque is applied to the steering shaft 12b, the magnetostrictive films 20b, 20c act as magnetic-characteristic variation parts in which the magnetic characteristics change in accordance with the torque. The coils 20d, 20e, which are provided around the magnetostrictive films 20b, 20c, respectively, detect the changes in magnetization as changes in inductance in response to changes in the magnetization state of the magnetostrictive films 20b, 20c when a torque is applied to the steering shaft 12b. The coils 20f, 20g are serially connected to the coils 20d, 20e, respectively. The coils 20f, 20g act as resistance elements and will therefore also be referred to below as "resistance elements 20f, 20g." A voltage-applying part 52 is also provided and is composed of a bridge circuit. The bridge circuit is composed of switching elements 50a, 50b, 50c, 50d, and a constant voltage source 51, which supplies a voltage to the bridge circuit. The voltage-applying part 52 applies voltage of a prescribed period to a bridge circuit that is composed of the two serial circuits that are formed from the coils 20d, 20e and the resistance elements 20f, 20g.

Figure 4:
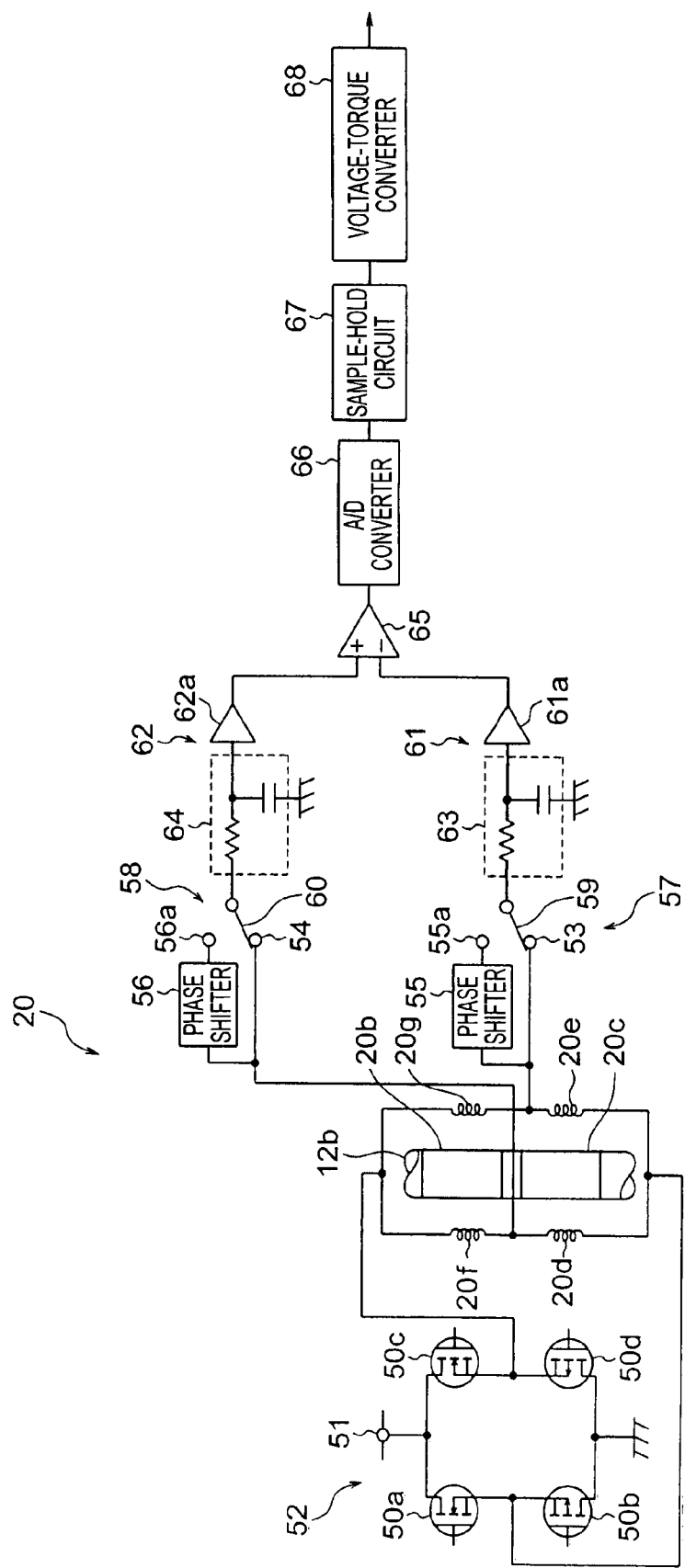
FIG. 4 is an electrical circuit diagram of the magnetostrictive torque sensor system according to the embodiment of the present invention.

In order to detect changes in the voltage (terminal voltage) of both ends of the coils 20d, 20e in the electrical circuit configuration shown in FIG. 4, a detection terminal 53 is provided to the connecting part between the resistance element 20f and the coil 20d, and a detection terminal 54 is provided to the connecting part between the resistance element 20g and the coil 20e. Phase-shifting parts 55, 56 are also provided to invert (prompt a 180° shift in) the phase of the voltage change of both ends of the coils 20d, 20e. The voltage signals retrieved from the detection terminals 53, 54 and the voltage signals retrieved from the output ends of the phase-shifting parts 55, 56 are alternatingly selected and output by selecting parts 57, 58. The selecting part 57 is provided with a movable selector 59 that alternately selects the detection terminals 53, 55a on the fixed side. The selecting part 58 is also provided with a movable selector 60 that selects the detection terminals 54, 56a.

A filter 61 is provided in the stage subsequent to the selecting part 57. The filter 61 cuts out noise included in the voltage signal output from the selecting part 57 and acts to smooth the changes in the voltage signal. The filter 61 is provided with a smoothing part 63 at the input stage for smoothing the changes in the voltage signal output from the selecting part 57 and for outputting a direct-current voltage. A filter 62 is also provided to the stage subsequent to the selecting part 58. The filter 62 cuts out noise included in the voltage signal output from the selecting part 58 and smoothes the changes in the output voltage signal. The filter 62 is provided with a smoothing part 64 at the input stage for smoothing the changes in the voltage signal output from the selecting part 58 and for outputting a direct-current voltage. Amplifiers 61a, 62a are provided to the output stages of the filters 61, 62. A calculating part 65 is provided to the stage subsequent to the filters 61, 62 in order to calculate the difference between the two direct-current voltages output from the amplifiers 61a, 62a.

The stage subsequent to the calculating part 65 is provided with an AD converting part 66 for converting the analog signal from the calculating part 65 into a digital signal; a sample-hold circuit 67 for holding the digital signal from the AD converting part 66; and a voltage-torque converting part 68 for converting the signal output from the sample-hold circuit 67 to a torque value (T).

Figure 5:
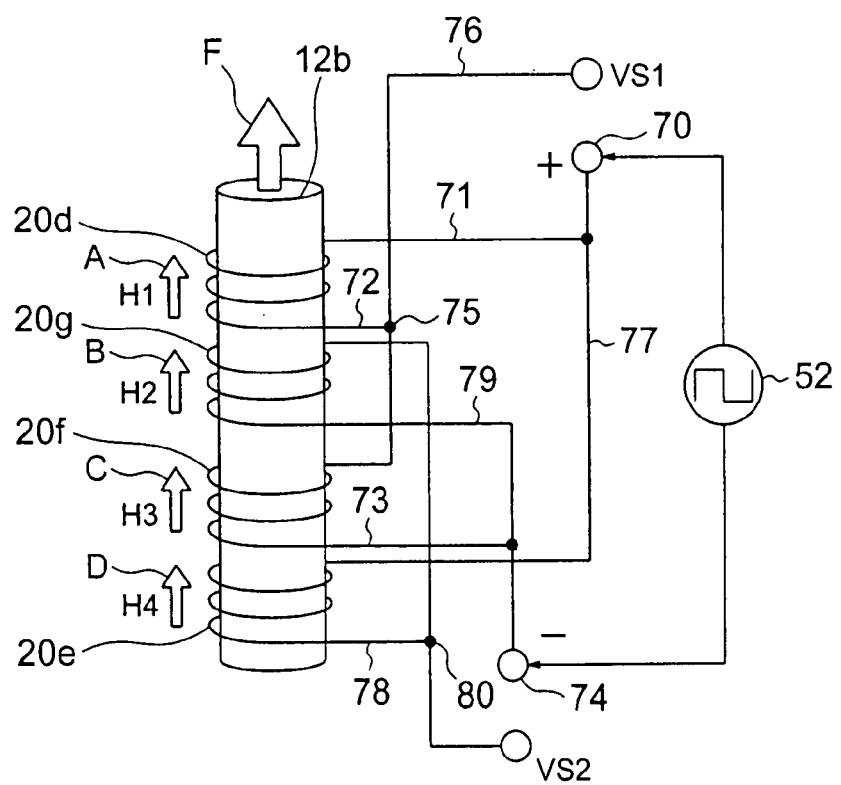
FIG. 5 is a schematic view illustrating a relationship between the positions and the connections of the coils of the voltage-applying part of the electrical circuit.

The coils 20d, 20e, 20f, 20g in the electrical circuit configuration above are wrapped around the steering shaft 12b in the actual placement structure, as shown in FIG. 5. In FIG. 5, a wiring 71 from an electrical source terminal 70 is connected to one end of the coil 20d, a wiring 72 from the other end of the coil 20d is connected to one end of the coil 20f, and a wiring 73 from the other end of the coil 20f is connected to the other electrical source terminal 74. A connection point 75 is also connected to a terminal VS1 via a wiring 76. Further, a wiring 77 from the electrical source terminal 70 is connected to one end of the coil 20e, a wiring 78 from the other end of the coil 20e is connected to one end of the coil 20g, and a wiring 79 from the other end of the coil 20g is connected to the other electrical source terminal 74. A connection point 80 is also connected to a terminal VS2.

The wrapping directions of each of the coils 20d through 20g as described above are established so that the directions of magnetic fields H1, H2, H3, H4, which are produced in the longitudinal direction of the steering shaft 12b, are all aligned. In other words, the wrapping directions of the coils 20d through 20g that are wrapped around the steering shaft 12b are established so as to be identical. An alternating current of a prescribed period is supplied to the electrical source terminals 70, 74 by the voltage-applying part 52.

According to the wiring and placement configuration of the coils shown in FIG. 5, the wrapping directions of the coils are established so that the directions (arrows A, B, C, D) of the magnetic fluxes (magnetic fields H1 through H4), which are produced in the longitudinal direction of the steering shaft 12b by the coils 20d through 20g, are all aligned when the switching terminals 50a through 50d of the voltage-applying part 52 are turned "on" or "off," as appropriate. The total magnetic field (arrow F) of the magnetic fields produced by the coils 20d through 20g can therefore be applied over the entire steering shaft 12b. A uniform and strong magnetic field can thereby be applied to the magnetostrictive films 20b, 20c, and hysteresis decreases.

According to the magnetostrictive torque sensor system 20 above, the hysteresis of the magnetostrictive torque sensor system 20 allows smooth and stable steering response to be obtained without any decline in steering assist or wheel (steering wheel 11) return when the wheel is released by the driver and returns.

Figure 6:
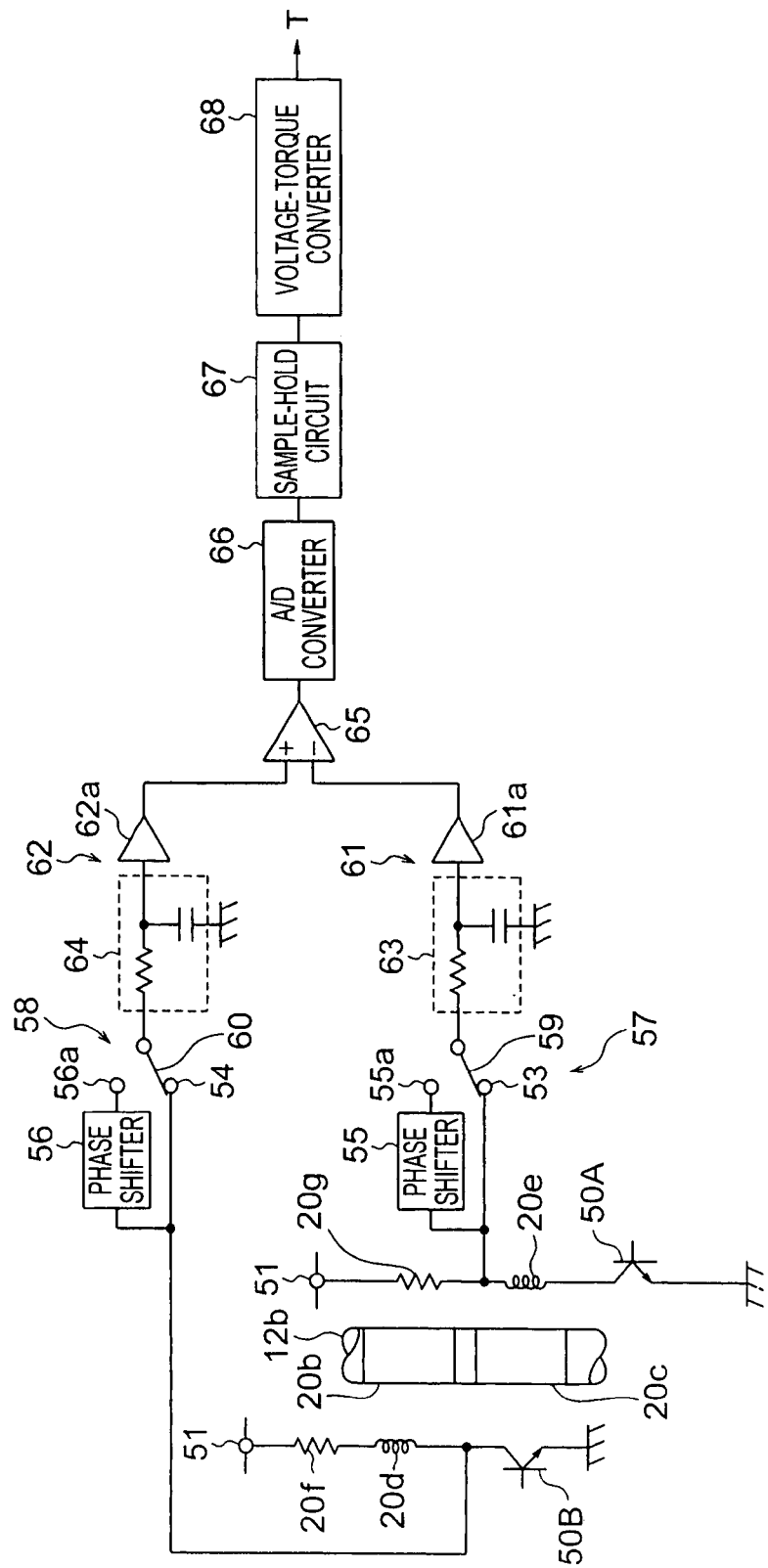
FIG. 6 is an electrical circuit diagram illustrating the components of the magnetostrictive torque sensor system.

The operation of the magnetostrictive torque sensor system 20 will be described next with reference to FIGS. 6 and 7. FIG. 6 shows an equivalent circuit that has been simplified from the electrical circuit of FIG. 4. FIG. 7(a) through 7(e) show the voltage waveforms at parts of the electrical circuit of FIG. 6.

A switching element 50A and a switching element 50B in the electrical circuit shown in FIG. 6 perform switching between "on" and "off" over a prescribed period. The switching element 50A and the switching element 50B are made from the four switching elements 50a through 50d that form the bridge circuit of the voltage-applying part 52.

The detection circuit will be described for one of the magnetostrictive films, i.e., for the magnetostrictive film 20c.

Figure 7:
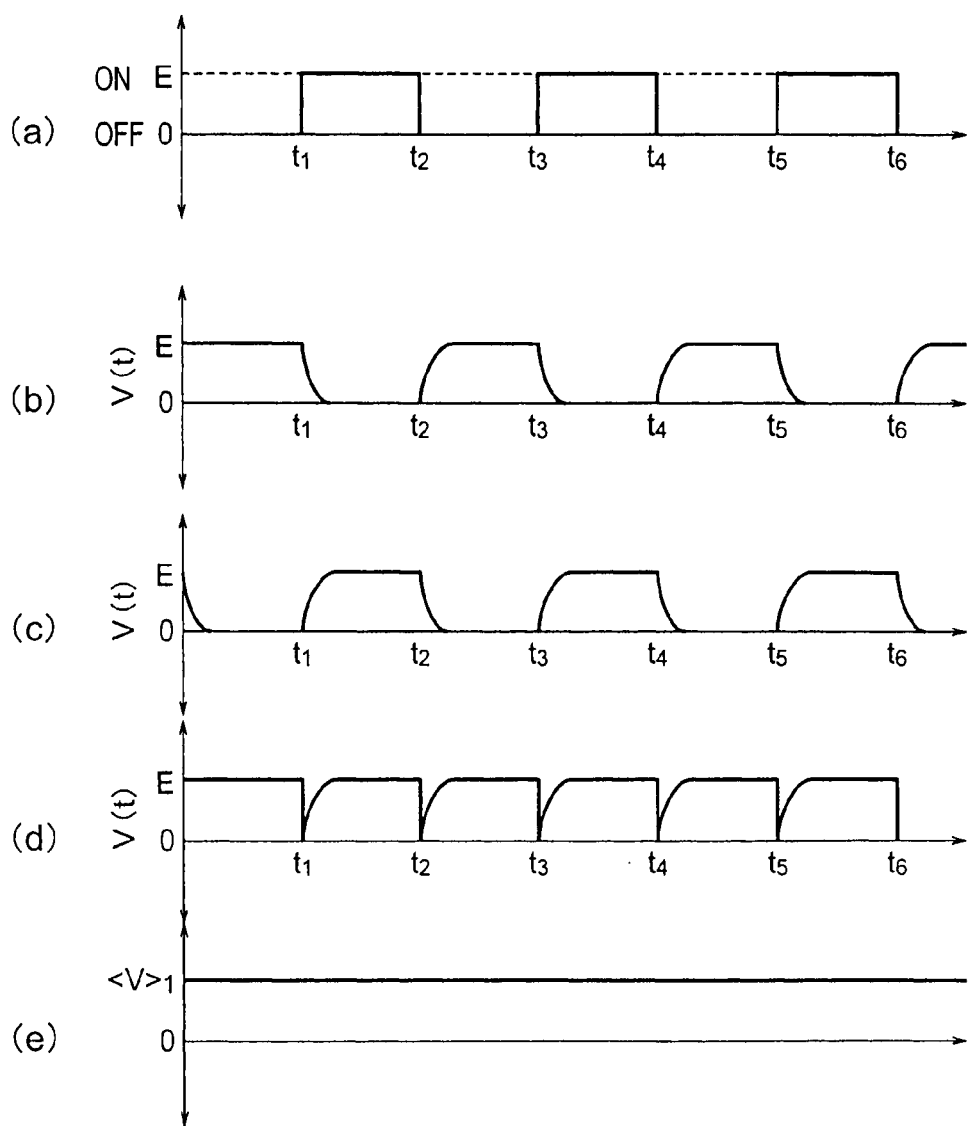
FIG. 7 shows voltage waveform diagrams (a) through (e) for first inductance values at locations in the electrical circuit shown in FIG. 6.

The waveform diagrams (a) through (e) in FIG. 7 variously designate changes over time in the applied voltage when the switching element 50A switches between "on" and "off" (a); changes over time in the output voltages from the terminal 53, the terminal 55a, and the output end of the selecting part 57 (b, c, d, respectively); and changes over time in the output voltage from the output end of the filter 61(e). In the waveform diagrams (a) through (e) in FIG. 7, the horizontal axis designates time and the vertical axis designates voltage.

Electrical current flows to the serial circuit composed of the resistance element 20g and the coil 20e when the switching element 50A switches "on" at times t1, t3, t5 and "off" at times t2, t4, t6, as shown in FIG. 7(a). The voltage in the terminal 53 undergoes variations as shown by the waveform in FIG. 7(b). The value of the inductance (L) of the coil 20e at this point is regarded to be L (μ1).

V(t) in FIG. 7(b) is the voltage of the terminal 53 at time t, and (e) is the electrical source voltage. The times t2, t4, t6 when the switching element 50A is switched to "off" are preferably set so that the maximum current that flows to the coil 20e has a value reaching the range in which the magnetization of the magnetostrictive film 20c is saturated due to the magnetic flux from the coil 20e produced by the maximum voltage.

The voltage waveform from the output end 55a of the phase-shifting part 55 is established so that the voltage waveform output is shifted by half a period (180°). This output voltage is shown in FIG. 7(e).

The selecting part 57 is set to switch at every half-period of the switching element 50B. The waveform of the voltage signal output from the output end of the selecting part 57 at this point is shown in FIG. 7(d).

The voltage signal then passes through the noise reduction filter 61, after which a direct-current voltage <V>$_1$ is output as shown in FIG. 7(*e*). A value that is proportional to the average value of the voltage output from the selecting part 57 is output in the smoothing part 63 of the filter 61. The signal "<V>" in this instance refers to "the value proportional to the average voltage value."

Figure 8:
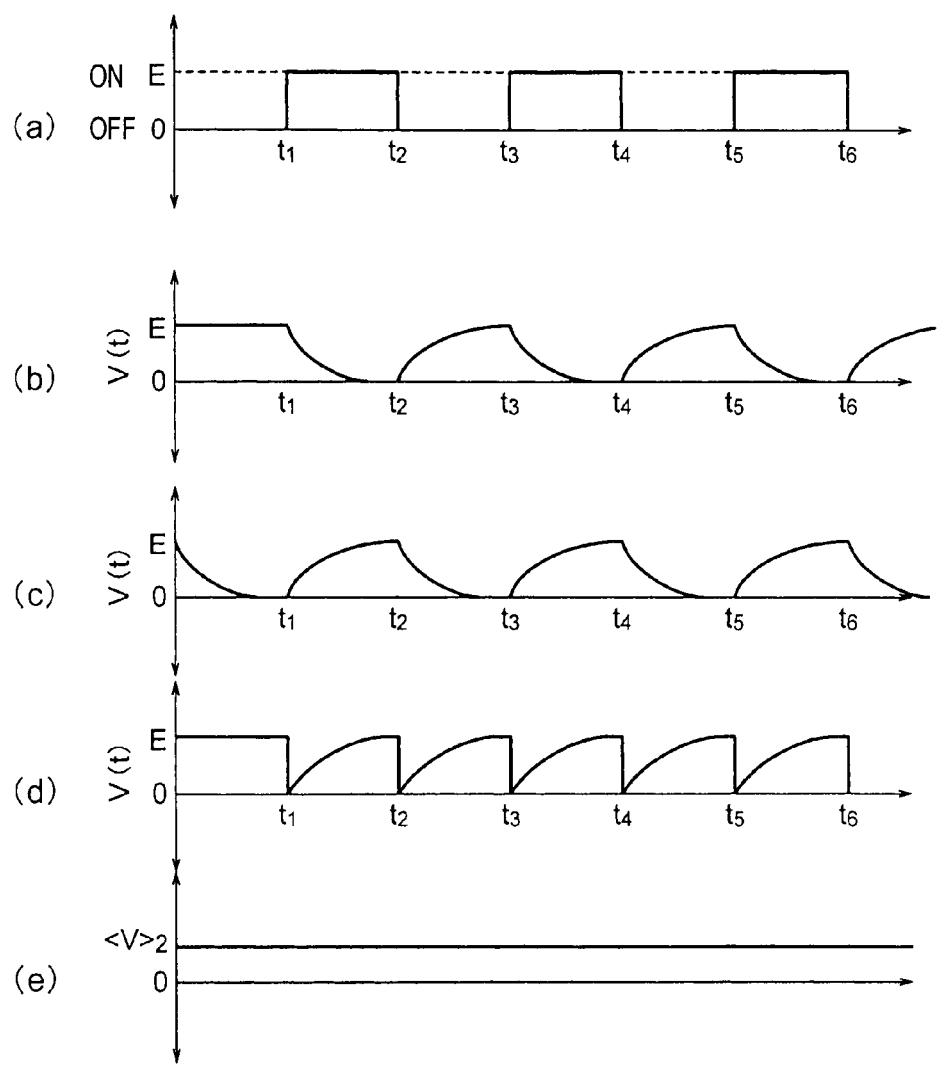
FIG. 8 shows voltage waveform diagrams (a) through (e) for second inductance values at locations in the electrical circuit shown in FIG. 6.

The waveforms (a) through (e) in FIG. 8 variously designate the changes over time in the applied voltage when the switching element 50A switches "on" or "off" in the case where the inductance value (L (μ2)) of the coil 20*e* is larger than the aforedescribed inductance value (L (μ1)) (a); changes over time in the output voltages from the terminal 53, the terminal 55*a*, and the output end of the selecting part 57 (b, d, d, respectively); and changes over time in the output voltage from the output end of the filter 61(e).

Electrical current flows to the serial circuit composed of the resistance element 20*g* and the coil 20*e* when the switching element 50A switches "on" at times t1, t3, t5 and "off" at times t2, t4, t6, as shown in FIG. 8(*a*). The voltage in the coil 20*e* undergoes variations as shown by the waveform in FIG. 8(*b*). The value of the inductance (L) of the coil 20*e* at this point is regarded to be L (μ2).

The voltage signal output from the output end 55*a* of the phase-shifting part 55 is established so that the voltage waveform output is shifted by half a period, as described above. The waveform of this output voltage is shown in FIG. 8(*c*).

The selecting part 57 is set to switch at every half-period of the switching element as described above. The waveform of the voltage signal output from the selecting part 57 at this point is shown FIG. 8(*d*).

The voltage signal then passes through the noise reduction filter 61, after which a direct-current voltage <V>$_2$ is output from the output part of the filter 61 as shown FIG. 8(*e*). A value output from the output end of the filter 61 is proportional to the average value of the voltage output from the selecting part 57.

As shown in FIGS. 7 and 8, the direct-current voltage <V>$_1$ and the direct-current voltage <V>$_2$ designate values that differ depending on changes in the inductance value L (μ). The inductance value L (μ) depends on the magnetic permeability of the magnetostrictive films 20*b*, 20*c*. The magnetic permeability μ changes depending on the action of the torque of the steering shaft 12*b* on the magnetostrictive films 20*b*, 20*c*, and therefore the steering torque applied to the steering shaft (12*a*, 12*b*) can be detected by measuring the aforedescribed direct-current voltage.

The configuration and operation of the detection electrical circuit of the other magnetostrictive film, i.e., the magnetostrictive film 20*b*, are identical to those in the aforedescribed detection electrical circuit of the magnetostrictive film 20*c*. The direct-current voltage output from the output end of the filter 62 reflects the steering torque applied to the steering shaft (12*a*, 12*b*).

Figure 9:
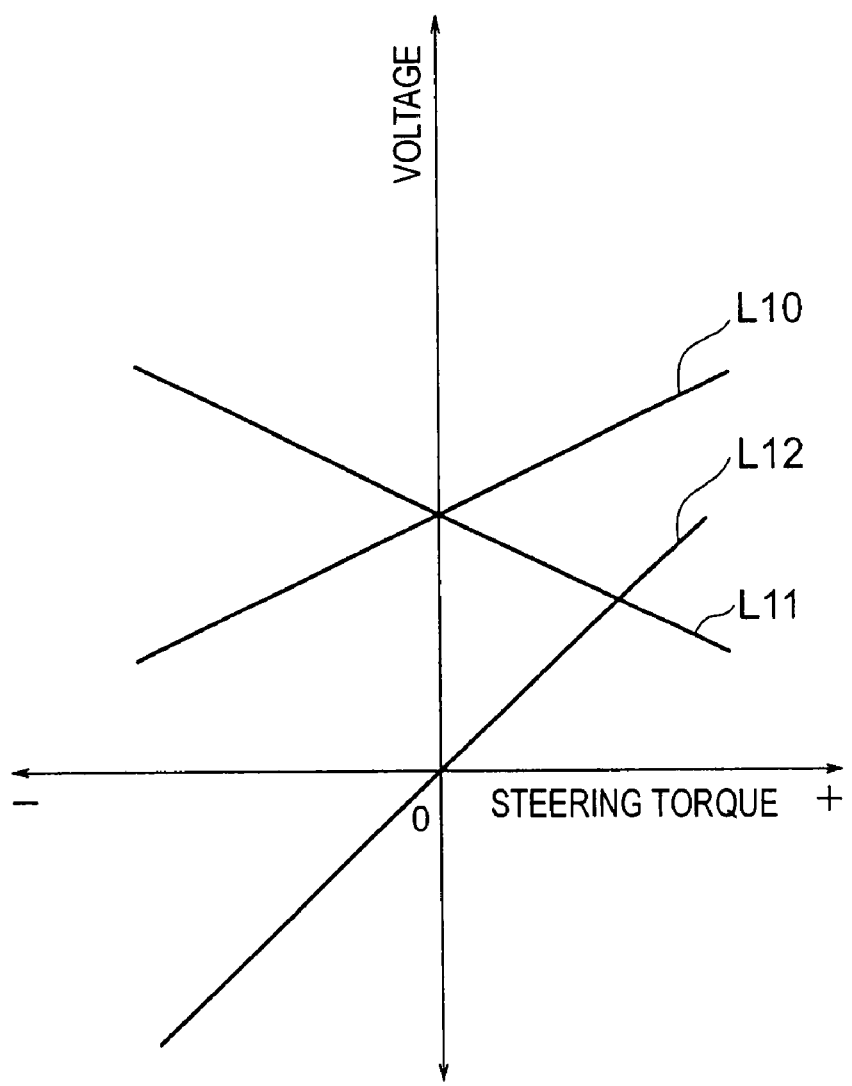
FIG. 9 is a graph showing a relationship between steering torque and detection voltage.

FIG. 9 is a graph that shows the relationship between the direct-current voltage and the torque applied to the steering shaft (12*a*, 12*b*), i.e., the steering torque. The direct-current voltages detected by way of the detection electrical circuits of the two magnetostrictive films 20*b*, 20*c* are line L10 and line L11, respectively. The magnetostrictive films 20*b*, 20*c* are formed in two locations, upper and lower, so as to have magnetic anisotropy in mutually opposing directions. The result of these magnetic anisotropies is reflected in the symmetry about the vertical axis. The line L12 designates a value resulting from subtracting the characteristic line L11 from the characteristic line L10, which were detected by the two coils 20*e*, 20*f*. The value of line 12, which is zero when the steering torque is zero, displays a linear change with the change in the steering torque. The steering torque can be detected from the values of the respective detection electrical circuits, which include the two detection coils 20*e*, 20*f*, by using the characteristics of the line 12.

The two direct-current voltages from the amplifiers 61*a*, 62*a* are calculated in the calculating part 65 shown in FIG. 6. The output voltage of the calculating part 65 is converted from analog to digital in the AD converting part 66 and input to the sample-hold circuit 67. Downstream from the sample-hold circuit 67, the voltage value is converted into the torque value (T) in the voltage-torque converting part 68 and is then output.

The torque (T) can thus be detected using the voltage-torque converting part 68, which includes a table of previously established relationships between torque and voltage, and the voltage output by the calculating part 65.

The voltage input to the sample-hold circuit 67 as above is a direct-current voltage. The sample-hold circuit 67 is therefore not used in the range in which the frequency characteristics decay, and phase lag does not occur in the sample-hold circuit or in the sensor output. As a result, phase lag is not experienced in the control of the electric power-steering apparatus, and control is stabilized, allowing smooth steering sensitivity to be obtained.

Obviously, various minor changes and modifications of the present invention are possible in light of the above teaching. It is therefore to be understood that within the scope of the appended claims the invention may be practiced otherwise than as specifically described.

What is claimed is:

1. A magnetostrictive torque sensor system comprising:
    at least one magnetic-characteristic variation part mounted on a rotating shaft for producing a magnetic characteristic that varies in accordance with an applied torque;
    a coil positioned around the magnetic-characteristic variation part for responding a change in the magnetic characteristic;
    a resistance element serially connected to the coil;
    voltage-applying means for periodically applying a voltage to a serial circuit formed from the coil and the resistance element;
    a terminal for retrieving a change in a terminal voltage of the coil;
    phase-shifting means for inverting a phase of the change in the terminal voltage of the coil;
    selecting means for alternatingly selecting and outputting a voltage change in the terminal and a voltage change in an output end of the phase-shifting means; and
    smoothing means for smoothing a voltage signal output from the selecting means and for outputting a direct-current voltage.

2. The sensor system of claim 1, wherein two of the magnetic-characteristic variation parts are provided to the rotating shaft and the coil, resistance element, voltage-applying means, terminal, phase-shifting means, selecting means, and smoothing means are individually provided to the two respective magnetic-characteristic variation parts, and calculating means is provided for calculating a difference in the two voltage signals output from each of the two smoothing means.

3. The sensor system of claim 1, wherein the resistance element is a coil that is positioned around the rotating shaft, and a wrapping direction on the rotating shaft is the same for at least one of the coils responding to the change in the magnetic characteristic and for at least one of the coils used as the resistance element.

4. The sensor system of claim 1, wherein the voltage-applying means comprises a constant voltage source and a switching element connected to the constant voltage source.

5. An electric power-steering apparatus comprising:

a motor for applying a torque to a steering shaft;

a magnetostrictive torque sensor system for detecting a steering torque applied to the steering shaft;

target-current calculating means for calculating a target electrical current of the motor in accordance with a signal from the sensor system; and driving means for driving the motor, wherein the sensor system comprises:

a magnetic-characteristic variation part provided to the steering shaft, wherein a magnetic characteristic of the magnetic-characteristic variation part changes in accordance with the applied torque;

a coil positioned around the magnetic-characteristic variation part for responding to a change in the magnetic characteristic;

a resistance element serially connected to the coil;

voltage-applying means for periodically applying a voltage to a serial circuit that is formed from the coil and the resistance element;

a terminal for retrieving a change in a terminal voltage of the coil;

phase-shifting means for inverting a phase of the change in the terminal voltage of the coil;

selecting means for alternatingly selecting and outputting a voltage change in the terminal and a voltage change in an output end of the phase-shifting means; and smoothing means for smoothing a voltage signal output from the selecting means and for outputting a direct-current voltage.

* * * * *